United States Patent
Schulze et al.

(10) Patent No.: US 12,304,099 B2
(45) Date of Patent: May 20, 2025

(54) METHOD FOR DISASSEMBLING A BATTERY HOUSING OF A HIGH-VOLTAGE BATTERY SYSTEM

(71) Applicant: Volkswagen Aktiengesellschaft, Wolfsburg (DE)

(72) Inventors: Malte Schulze, Gifhorn (DE); Ernst Storm, Wahrenholz (DE); Frank Greppler, Wolfenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 467 days.

(21) Appl. No.: 17/739,858

(22) Filed: May 9, 2022

(65) Prior Publication Data

US 2022/0355498 A1 Nov. 10, 2022

(30) Foreign Application Priority Data

May 10, 2021 (DE) ..................... 10 2021 204 685.1

(51) Int. Cl.
*B26D 1/147* (2006.01)
*B60K 1/04* (2019.01)
*H01M 10/54* (2006.01)
*H01M 50/262* (2021.01)

(52) U.S. Cl.
CPC ............... *B26D 1/147* (2013.01); *B60K 1/04* (2013.01); *H01M 10/54* (2013.01); *H01M 50/262* (2021.01); *B60K 2001/0461* (2013.01)

(58) Field of Classification Search
CPC ........ B26D 1/0006; B26D 1/147; B26D 1/16; B26D 2001/0053; B60K 1/04; H01M 10/54; H01M 50/249; H01M 50/262
See application file for complete search history.

(56) References Cited

U.S. PATENT DOCUMENTS

| | | | |
|---|---|---|---|
| 3,972,738 A | | 8/1976 | Bernaldo |
| 4,058,886 A | | 11/1977 | Alvarez |
| 7,694,614 B2 | | 4/2010 | Hilgendorf |
| 2018/0083243 A1 | | 3/2018 | Brausse et al. |
| 2020/0411815 A1 | | 12/2020 | Shin et al. |
| 2022/0355498 A1* | | 11/2022 | Schulze ............... H01M 10/54 |

FOREIGN PATENT DOCUMENTS

| | | | | |
|---|---|---|---|---|
| CN | 109129637 A | | 1/2019 | |
| CN | 208580824 U | * | 3/2019 | ............. B23D 79/00 |
| CN | 211789363 U | | 10/2020 | |
| DE | 102012019087 A1 | | 3/2014 | |
| DE | 102016107312 A1 | | 11/2016 | |
| DE | 102016107372 A1 | | 10/2017 | |
| DE | 102016117442 A1 | | 3/2018 | |
| DE | 102018211637 A1 | | 1/2020 | |
| EP | 3644398 A1 | | 4/2020 | |

* cited by examiner

*Primary Examiner* — Minh N Trinh
(74) *Attorney, Agent, or Firm* — Muncy, Geissler, Olds & Lowe, P.C.

(57) ABSTRACT

A method for disassembling a battery housing of a high-voltage battery system, in particular of a vehicle, in which housing parts of the battery housing are in material connection with each other along joining flanges, wherein for disassembling the battery housing a disassembly tool is inserted into a joining gap between the joining flanges to loosen the material connection.

7 Claims, 3 Drawing Sheets

METHOD FOR DISASSEMBLING A BATTERY HOUSING OF A HIGH-VOLTAGE BATTERY SYSTEM

This nonprovisional application claims priority under 35 U.S.C. § 119(a) to German Patent Application No. 10 2021 204 685.1, which was filed in Germany on May 10, 2021, and which is herein incorporated by reference.

BACKGROUND OF THE INVENTION

Field of the Invention

The present invention relates to a method for disassembling a battery housing of a high-voltage battery system, a disassembly tool and use of the disassembly tool for disassembling a battery housing.

Description of the Background Art

The battery housing of a high-voltage battery system can be constructed from two housing halves, namely a housing base (i.e., battery tray) and a housing cover. After installation of all battery components (i.e., modules, wiring harnesses, power electronics), the two halves of the housing must be connected to each other in such a way that tightness and thus safety is ensured over the service life of the battery system. For this purpose, the housing halves can be glued together.

In a generic method for disassembling a battery housing, a disassembly tool is inserted into a joining gap between the joining flanges of battery housing parts glued together to loosen the adhesive bond.

The technical problem is to open the housing halves glued together in the shortest possible process time and with reliable repeatability in an automated process. In the prior art, the adhesive connection is usually cut open manually with an oscillating saw. Care must be taken to ensure that the saw teeth do not break off or that too high a temperature is introduced by friction, so that the housing parts re-glue after the cutting process.

Such a cutting process can be carried out with great effort on the part of workers as well as by means of crushing tools. It has been shown that a cutting process with an oscillating saw cannot be transferred to a fully automated series process for disassembling the battery housing. In addition, in the prior art, the personnel costs for disassembling the battery housing are comparatively high. A slight, incorrect loading on the saws can lead to breakage of the saw teeth (of the saw blade). In addition, excessive heat exposure during the cutting process can lead to re-gluing of the battery housing parts.

From DE 10 2018 211 637 A1 a device for opening a prismatic battery cell is known, and from DE 10 2016 107 372 A1 a housing for receiving high-voltage components is known, which are both herein incorporated by reference.

SUMMARY OF THE INVENTION

It is therefore an object of the present invention to provide a method for disassembling a battery housing of a high-voltage battery system, which is simple and reliable in comparison to the prior art in terms of manufacturing technology.

An exemplary embodiment of the invention is based on a method for disassembling a battery housing of a high-voltage battery system in which housing parts of the battery housing are at least in material connection with each other (sometimes additionally screwed together) along joining flanges. To disassemble the battery housing, a disassembly tool is inserted into a joining gap between the joining flanges to loosen the material connection. According to the characterizing portion of claim 1, the disassembly tool is realized as a rotary cutter. During the disassembly process, this is inserted into the joining gap in an infeed movement in the joining flange transverse direction over a penetration depth and rolled off in a forward movement along the flange connection in the longitudinal direction of the joining flange.

Specifically, the material connection can be an adhesive bond in which the two joining flanges are glued together with an intermediate adhesive layer.

A core idea of the invention is that opening the battery housing is realized as a multi-stage process of cutting, damaging, and pressing the two housing parts. In the method, the disassembly tool can be inserted into the adhesive seam, which damages the latter. Subsequently, an additional mechanical separation force (hereinafter referred to as the lever force) builds up through the further insertion of the disassembly tool, which force is introduced into the two housing parts via the disassembly tool. The initiated lever force pushes the two housing parts apart.

The disassembly tool, that is, the rotary cutter, may preferably have two design areas, namely a first design area which is very flat and sharp as a blade to damage the bonding when penetrating. In the second design area, the tool thickness increases to press the housing halves by means of the deeper penetration of the tool. The combined use of both design areas of the rotary cutter causes the battery housing to open.

By using the rotary cutter, the disassembly process can be easily automated using robot support with regard to a large-scale industrial application, which gains in economic importance in particular with the return of high quantities of used batteries.

According to the invention, damage to the adhesive connection using an oscillating saw and levering apart the housing carried out as separate process steps are thus dispensed with. Rather, the core of the invention includes the combination of a cutting force that is damaging to the adhesive seam and a lever force for opening the housing halves.

By way of example, the tool can be attached to a robot arm and automatically inserted into the adhesive seam between the two housing parts. The robot arm then moves along the battery contour following the adhesive seam. By adjusting the penetration depth into the adhesive seam, the intensity of the pressing of the two housing parts can be varied and controlled.

In general, the rotary cutter can have a motor-driven, electric rotary drive, so that the cutting process is realized as a milling process. In this case, the robot moves along the battery contour and separates the housing parts by milling.

With such a milling process, however, only a reduced feed and thus only a low overall process speed can be realized due to the heat input. In addition, the milling process is associated with chip formation. The milling chips can penetrate into the inside of the housing and possibly cause short circuits there. In addition, when such milling is used, it is no longer possible to trace exactly which foreign bodies have penetrated into the housing interior due to the milling process and which foreign bodies have penetrated the inside of the housing over the battery life, which limits the applicability of the milling process, or a subsequent analysis of the foreign bodies found. In addition, after the milling process, a residue of the other housing part usually remains on one housing part. Therefore, no homogeneous separation of the materials is possible, which is disadvantageous with regard to sorted waste or material separation.

Thus, it is preferred if the rotary cutter is freely rotatable about a rotation axis. In this case, the rotary drive of the rotary cutter takes place passively, that is, as a result of the forward movement without any additional, external electrical energy.

In the following, aspects of the invention are again emphasized in detail: This means the material connection between the joining flanges can extend in the joining flange transverse direction over a flange width. Preferably, the penetration depth of the rotary cutter may be less than this flange width. This ensures the following process control: after the cutting process has been carried out, a residual material connection remains between the joining flanges over a residual flange width. Following the cutting process, a lever operation can be carried out in which the two joining flanges are pushed apart with a lever force so that the residual material connection tears open.

The two joining flanges can be in material connection with each other at a joining plane. With regard to flawless disassembly processing, the rotation axis of the rotary cutter can be aligned at right angles to the joining plane.

In a technical implementation, the cutting blade geometry can be rotationally symmetrical to the axis of rotation. The cutting blade geometry can be realized in such a way that both the cutting process and the levering process are carried out by the rotary cutter. For this purpose, the cutting blade may have a cutting blade bottom, in particular aligned at right angles to the axis of rotation. This can form a flat cone angle with a radial outer, circumferential cutting flank. The radial outer cutting flank can merge into a radially inner, circumferential lever flank at a transition edge. This can form a steep cone angle with the cutting blade bottom. In this case, the following process control results: in the course of the infeed movement of the rotary cutter, an outer part of one of the joining flanges can come into sliding contact with the radial inner lever flank of the cutting blade until the penetration depth is reached. This builds up a lever force by means of which the two joining flanges are pushed apart.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
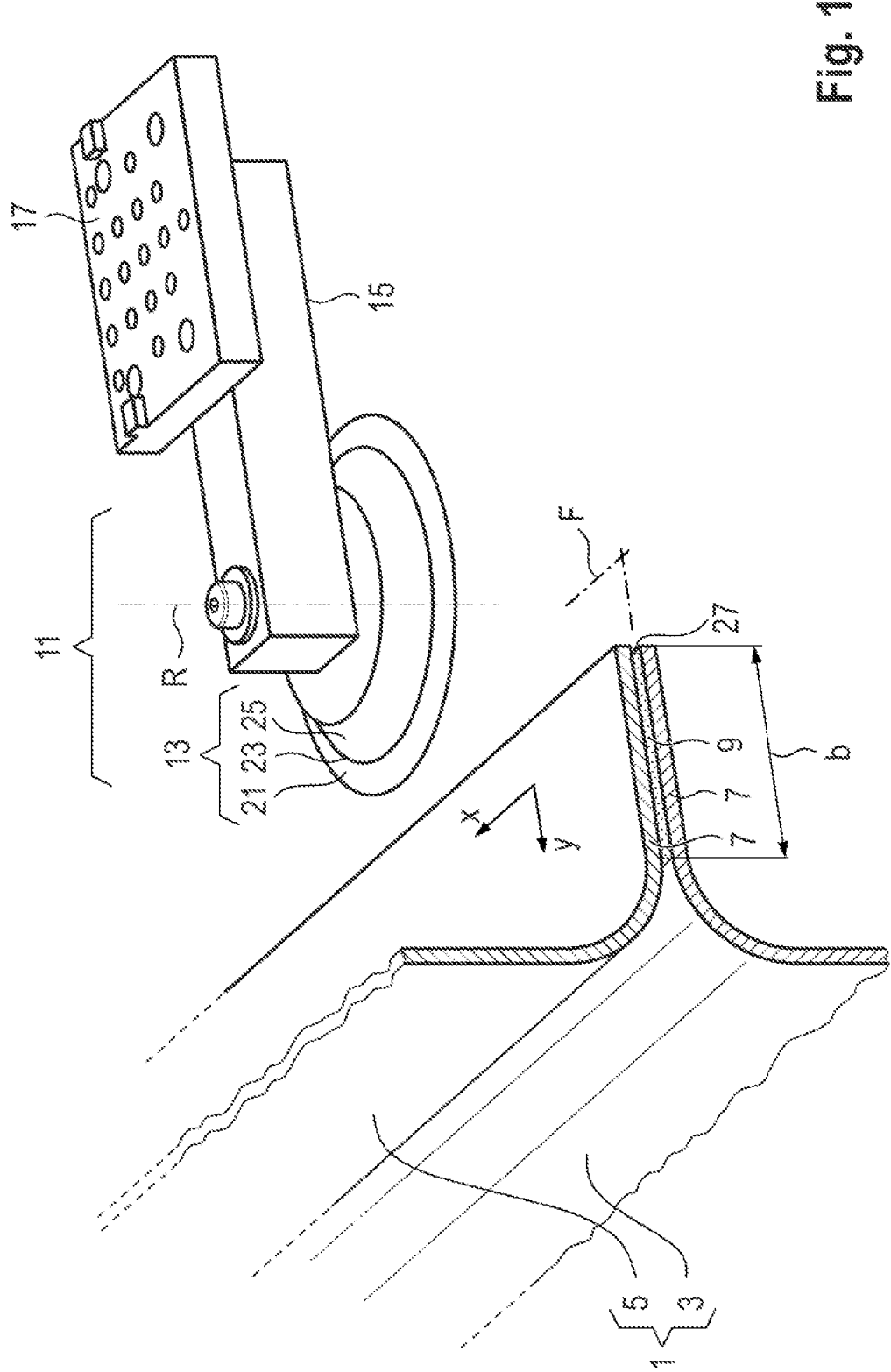
FIG. 1 is a rotary cutter in a perspective representation.
Figure 3:
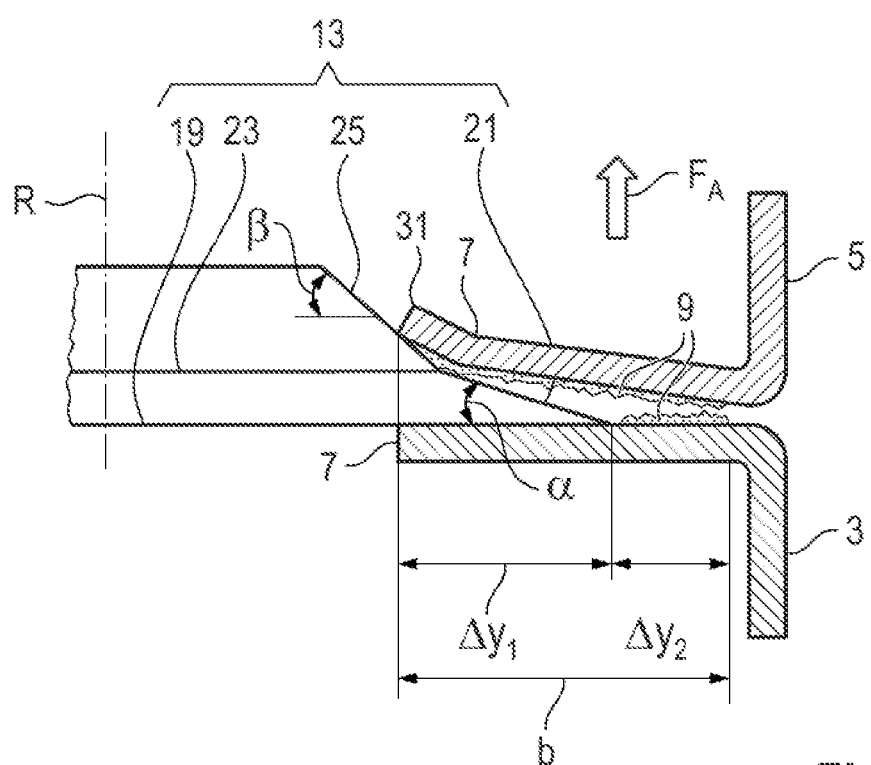

FIG. 1 indicates a battery housing 1 of a high-voltage battery system, which is composed of two halves of the housing, namely a battery tray 3 and a battery cover 5. Battery components (such as battery modules, wiring harnesses and power electronics) that are not shown are arranged inside the housing. The two housing halves 3, 5 each have joining flanges 7 protruding from the outside of the housing, which are bonded together and in which the two joining flanges 7 are glued together at a joining plane F with an intermediate adhesive layer 9. The flange connection thus formed runs in a flange longitudinal direction x over the entire battery housing circumference. In FIG. 1 or 3, the adhesive connection extends in a joining flange transverse direction y over a flange width b.

The disassembly of the battery housing 1 can be carried out robot-assisted. For this purpose, a disassembly tool 11 is provided in FIG. 1. The disassembly tool 11 is realized as a rotary cutter with a circular disc-shaped cutting blade 13. This is rotatably mounted about a rotation axis R on a bearing console 15. The bearing console 15 can be mounted via a base plate 17 on an unseen distal end of a robot arm.

In the following, the cutting blade geometry, which is rotationally symmetrical to the rotation axis R, is described on the basis of the figures: Accordingly, the cutting blade 13 has a cutting blade bottom 19 aligned perpendicular to the rotation axis R. This forms a flat cone angle $\alpha$ (FIG. 3) with a radially outer, circumferential cutting flank 21. The radially outer cutting flank 21 merges at a transition edge 23 into a radially inner, circumferential lever flank 25, which forms a steep cone angle $\beta$ (FIG. 3) with the cutting blade bottom 19.

Figure 2:
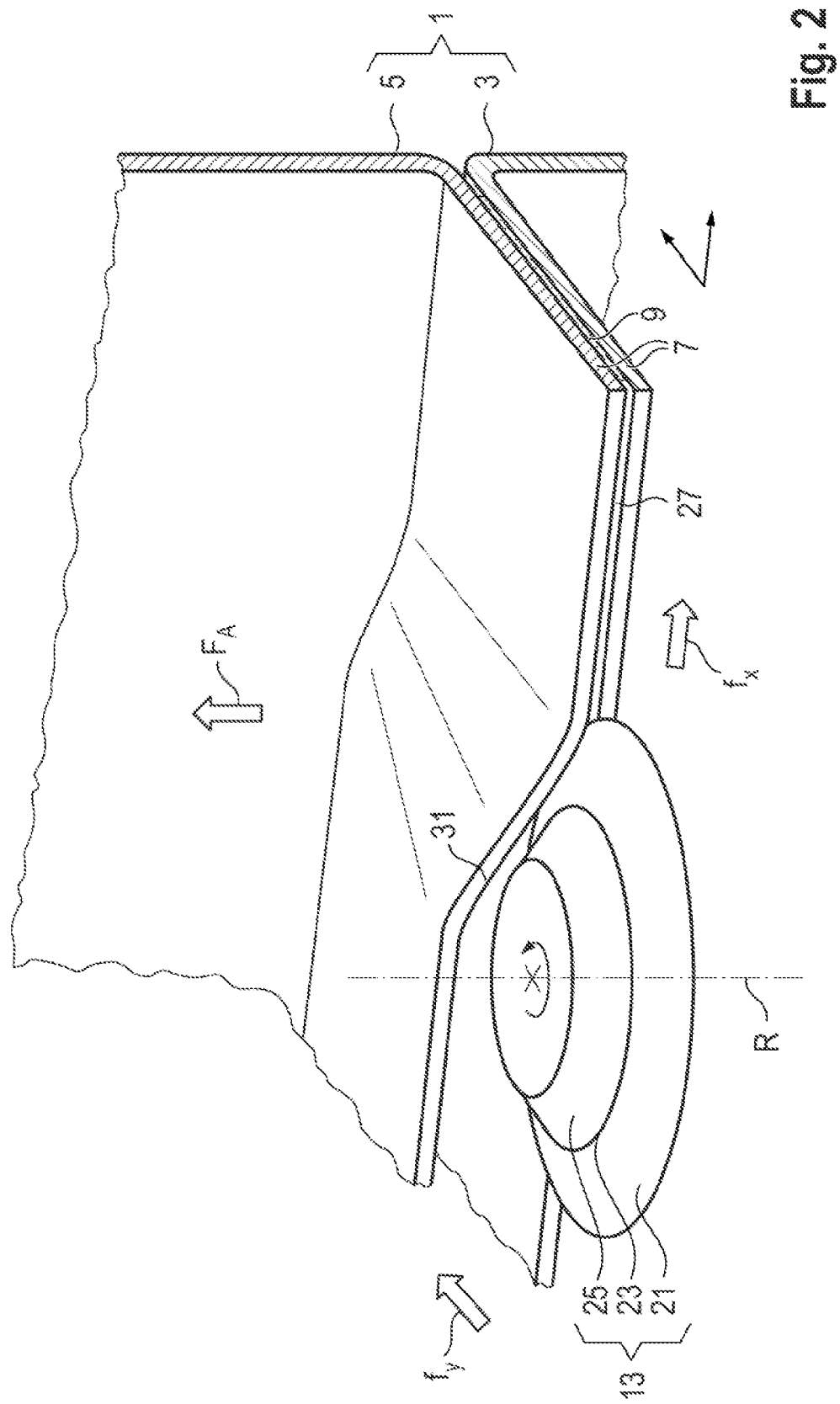
FIGS. 2 and 3 are, respectively, views illustrating a disassembly process.

By means of the cutting blade geometry described above, the disassembly process illustrated below on the basis of FIGS. 2 and 3 can be carried out: First, the cutting blade 13 is inserted in an infeed movement $f_y$ in the joining flange transverse direction y over a penetration depth $\Delta y_1$ (FIG. 3) into a joining gap 27 between the two joining flanges 7. In FIG. 3, the penetration depth $\Delta y_1$ of the rotary cutter 11 is smaller than the flange width b. This means that after the infeed movement $f_y$, a residual adhesive bond remains between the joining flanges 7 over a residual flange width $\Delta y_2$.

A forward movement $f_x$ of the rotary cutter 11 along the flange connection in the joining flange longitudinal direction x is superimposed in time on the infeed movement $f_y$, or temporally follows the infeed movement $f_y$. During the forward movement $f_x$, the circular disc-shaped cutting blade 13 rolls off passively while separating the adhesive connection in the longitudinal direction of the joining flange x. In the infeed movement $f_y$ and the forward movement $f_x$, the cutting blade bottom 19 is supported in sliding contact on the facing, lower joining flange 7.

In the course of the infeed movement $f_y$, until reaching the penetration depth $\Delta y_1$, the upper joining flange 7 with its outer edge 31 (FIG. 2) comes into sliding contact with the lever flank 25 of the cutting blade 13, whereby a lever force $F_A$ builds up, by means of which the two joining flanges 7 are pushed apart.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for disassembling a battery housing of a high-voltage battery system in a vehicle with a disassembly tool, the battery housing having housing parts that are in material connection with each other along joining flanges, the joining flanges having a joining gap therebetween and each extending along a flange longitudinal direction and having a flange width extending along a flange transverse direction, the method comprising:
- providing the disassembly tool, the disassembly tool including a rotary cutter;
- inserting, in an infeed movement in the flange transverse direction, the rotary cutter of the disassembly tool into the joining gap between the joining flanges until the rotary cutter reaches a penetration depth in the joining gap in order to loosen the material connection; and
- while the rotary cutter is inserted into the joining gap at the penetration depth, moving the rotary cutter in a forward movement in the flange longitudinal direction to separate the material connection along the joining flanges,
- wherein the material connection between the joining flanges extends over the flange width in the flange transverse direction, wherein the penetration depth of the rotary cutter is set to be less than the flange width so that after completion of the infeed movement, a residual portion of the material connection remains between the joining flanges over a residual flange width, and wherein after completion of the infeed movement, a levering process takes place, in which a lever force builds up via which the joining flanges are pressed apart so that the residual portion of the material connection tears open.

2. The method according to claim 1, wherein the joining flanges are in material connection with each other at a joining plane, and wherein during the forward movement, the rotary cutter rolls off about an axis of rotation, the axis of rotation being aligned at a right angle to the joining plane.

3. The method according to claim 2, wherein the rotary cutter is not assigned a rotary drive operated by external energy, so that during the forward movement of the rotatory cutter, the rotary cutter only passively rolls off during the forward movement.

4. The method according to claim 1, wherein the material connection is an adhesive connection in which the joining flanges are glued together with an intermediate adhesive layer, such that during the insertion of the rotary cutter into the joining gap, the intermediate adhesive layer is loosened.

5. The method according to claim 1, wherein the rotary cutter has a circular disc-shaped cutting blade, which is freely rotatably mounted about an axis of rotation, so that during the forward movement of the rotary cutter, the rotary cutter rolls off about the axis of rotation.

6. The method according to claim 5, wherein a geometry of the cutting blade is rotationally symmetrical with respect to the axis of rotation, such that both the infeed movement and the levering process are carried out via the rotary cutter.

7. A method for disassembling a battery housing of a high-voltage battery system in a vehicle with a disassembly tool, the battery housing having housing parts that are in material connection with each other along joining flanges, the joining flanges having a joining gap therebetween and each extending along a flange longitudinal direction and having a flange width extending along a flange transverse direction, the method comprising:
- providing the disassembly tool, the disassembly tool including a rotary cutter;
- inserting, in an infeed movement in the flange transverse direction, the rotary cutter of the disassembly tool into the joining gap between the joining flanges until the rotary cutter reaches a penetration depth in the joining gap in order to loosen the material connection; and
- while the rotary cutter is inserted into the joining gap at the penetration depth moving the rotary cutter in a forward movement in the flange longitudinal direction to separate the material connection along the joining flanges,
- wherein the rotary cutter has a circular disc-shaped cutting blade, which is freely rotatably mounted about an axis of rotation, so that during the forward movement of the rotary cutter, the rotary cutter rolls off about the axis of rotation,
- wherein a geometry of the cutting blade is rotationally symmetrical with respect to the axis of rotation, such that both the infeed movement and the levering process are carried out via the rotary cutter,
- wherein the cutting blade has a cutting blade bottom, which is aligned substantially perpendicular to the axis of rotation, wherein during the infeed movement and the levering process, the cutting blade bottom is supported on one of the joining flanges,
- wherein the cutting blade bottom forms a flat cone angle with an outer radial, circumferential cutting flank of the cutting blade, and the outer radial, circumferential cutting flank merges into a radial inner, circumferential lever flank at a circumferential transition edge, the radial inner, circumferential lever flank forming a steep cone angle with the cutting blade bottom, such that during the infeed movement or the forward movement, an outer portion of one of the joining flanges comes into sliding contact with the radial inner, circumferential lever flank to push apart the joining flanges by the lever force.

* * * * *